(12) United States Patent
Pan et al.

(10) Patent No.: US 7,435,497 B2
(45) Date of Patent: Oct. 14, 2008

(54) METAL COATED POLYMER ELECTROLYTE MEMBRANE HAVING A REINFORCEMENT STRUCTURE

(75) Inventors: Alfred I-Tsung Pan, Sunnyvale, CA (US); Yoocham Jeon, Palo Alto, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 395 days.

(21) Appl. No.: 11/250,051

(22) Filed: Oct. 12, 2005

(65) Prior Publication Data

US 2006/0027101 A1    Feb. 9, 2006

Related U.S. Application Data

(62) Division of application No. 10/212,720, filed on Aug. 7, 2002, now Pat. No. 6,977,009.

(51) Int. Cl.
*H01M 8/30* (2006.01)
(52) U.S. Cl. .......................................... 429/33; 429/30
(58) Field of Classification Search ................. None
See application file for complete search history.

(56) References Cited

U.S. PATENT DOCUMENTS 4,542,079 A * 9/1985 Takeuchi et al. .............. 429/39

* cited by examiner

*Primary Examiner*—Patrick Ryan
*Assistant Examiner*—Julian Mercado

(57) ABSTRACT

A metal-coated, wire-reinforced polymer electrolyte membrane that is permeable only to protons and hydrogen is disclosed. The metal-coated, wire-reinforced polymer electrolyte membrane has a surface microsturcture that prevents cracking of the metal coating during hydration. The metal-coated, wire-reinforced polymer electrolyte membrane can be used in liquid-type fuel cells to prevent crossover of fuel, gas and impurities.

6 Claims, 5 Drawing Sheets

METAL COATED POLYMER ELECTROLYTE MEMBRANE HAVING A REINFORCEMENT STRUCTURE

CROSS-REFERENCES TO RELATED APPLICATIONS

This application is a divisional of prior application Ser. No. 10/212,720, filed Aug. 7, 2002, now U.S. Pat. No. 6,977,009.

TECHNICAL FIELD

The technical field relates to metal-coated polymer electrolyte membranes, and in particular, to metal-coated polymer electrolyte membranes having a reinforcement structure to control membrane expansion and prevent cracking in the metal coating. The metal-coated, reinforced polymer electrolyte membrane can be used in electrochemical devices, such as fuel cells.

BACKGROUND

In fuel cells employing liquid fuel, such as methanol, and an oxygen-containing oxidant, such as air or pure oxygen, the methanol is oxidized at an anode catalyst layer to produce protons and carbon dioxide. At a cathode catalyst layer, oxygen reacts with the protons to form water. The anode and cathode reactions in this type of direct methanol fuel cell are shown in the following equations:

Anode reaction (fuel side): $CH_3OH + H_2O \rightarrow 6H^+ + CO_2 + 6e^-$   I

Cathode reaction (air side): $3/2\ O_2 + 6H^+ + 6e^- \rightarrow 3H_2O$   II

Net: $CH_3OH + 3/2\ O_2 \rightarrow 2H_2O + CO_2$   III

The two electrodes are connected within the fuel cell by an electrolyte to transmit protons from the anode to the cathode. The electrolyte can be an acidic or an alkaline solution, or a solid polymer ion-exchange membrane characterized by a high ionic conductivity. The solid polymer electrolyte is often referred to as a proton exchange membrane (PEM). PEMs such as Nafion™ are widely used in low temperature fuel cells, because of the electrolyte membrane's high proton conductivity and excellent chemical and mechanical stability. Since the electrolyte membrane is a polymer with a hydrophobic backbone and highly acidic side branches, the membrane must contain significant amounts of water to conduct protons from the electrode reactions. Therefore, the polymer electrolyte membrane is usually kept in high humidity environment to maintain a high proton conductivity.

PEM fuel cells use basically the same catalyst for both anode and cathode. In addition to undergoing electro-oxidation at the anode, a water soluble liquid fuel, such as methanol, may permeate through the PEM and combines with oxygen on the surface of the cathode electrocatalyst. This process is described by equation III for the example of methanol. This phenomenon is termed "fuel crossover". Fuel crossover lowers the operating potential of the oxygen electrode and results in consumption of fuel without producing useful electrical energy. In general, fuel crossover is a parasitic reaction which lowers efficiency, reduces performance and generates heat in the fuel cell. It is therefore desirable to minimize the rate of fuel crossover.

There are a number of approaches to reduce fuel crossover. The rate of crossover is proportional to the permeability of the fuel through the solid electrolyte membrane and increases with increasing fuel concentration and temperature. By choosing a PEM with low water content, the permeability of the membrane to the liquid fuel can be reduced. The reduced permeability for the fuel results in a lower crossover rate. Also, fuels having a large molecular size have a smaller diffusion coefficient than fuels having small molecular size. Hence, permeability can be reduced by choosing a fuel having a large molecular size. While water soluble fuels are desirable, fuels with moderate solubility exhibit lowered permeability. In addition, the permeability for vapors is higher than liquids, since fuels with high boiling points do not vaporize and their transport through the membrane is in the liquid phase, fuels with high boiling points generally have a low crossover rate. Furthermore, the wettability of the anode may be controlled by an optimum distribution of hydrophobic and hydrophilic sites, so that the anode structure may be adequately wetted by the liquid fuel to sustain electrochemical reaction, while excessive amounts of fuel are prevented from having access to the membrane electrolyte. Finally, the concentration of the liquid fuel can also be lowered to reduce the crossover rate.

In methanol fuel cells, fuel crossover is typically controlled by using diluted methanol fuel that contains 3% methanol and 97% water by weight. Because the reaction rate is proportional to the reactant, the low fuel concentration results in a low proton generation rate, which in turn leads to limited current drivability and voltage for a given current. Moreover, the fuel concentration gets lower and lower as the methanol is consumed and so does the power. Another problem is fuel efficiency. Since one water molecule (MW=18) is consumed with each methanol molecule (MW=34) in the electrochemical reaction, only about 1.6 wt % water will be consumed with methanol in a fuel composition containing only 3 wt % methanol, the other 95 wt % of water becomes "dead weight". Therefore, the real "consumable fuel" in the diluted methanol fuel accounts to less than 5% of the total fuel composition.

Other approaches to prevent fuel crossover in fuel cells have been developed. WO 96/29752 to Grot et al. discloses the incorporation of various inorganic fillers into cation exchange membranes made from polymers to decrease fuel crossover. U.S. Pat. No. 5,631,099 to Hockaday discloses fuel cell electrodes having thin films of catalyst and metal materials deposited on fiber reinforced porous membranes. It is suggested that the thin film electrode structure provides the capability to filter the reactant streams of various species, such as carbon monoxide or methanol if the metal electrode materials have selective permeability to hydrogen. U.S. Pat. No. 6,248,469 to Formato et al. discloses composite solid polymer electrolyte membranes which include a porous polymer substrate interpenetrated with an ion-conducting material. Fuel crossover resistance of the membranes can be optimized by using the proper blend of different polymers. None of these approaches, however, has provide satisfactory results.

U.S. Pat. No. 5,759,712 to Hockaday describes a hydrogen-only permeable electrode to block fuel crossover. The invention, however, requires an elaborated membrane structure that contains three layers of metal deposited on a porous membrane.

The major problem with a metal-coated polymer electrolyte membrane is the cracking of the metal coating during hydration when the polymer electrolyte membrane that the metal film covers expands in volume. As demonstrated in FIG. 1A, when a polymer electrolyte membrane 101 covered with a thin metal film 103 is placed in a high humidity environment, the polymer electrolyte membrane 101 absorbs the water and expands in volume. The volume expansion leads to an enlarged surface area and creates very high stress in the thin metal film 103, which eventually results in cracks 105 in the thin metal film 103. Fuel molecules can then permeate the polymer electrolyte membrane 101 through the cracks 105.

It has been found that the expansion-induced cracking of the metal film 103 can be avoided by creating a microtextured surface 107 on the polymer electrolyte membrane 101. As shown in FIG. 1B, the microtextured surface 107 contains many protrusions 108 that flatten out when the polymer electrolyte membrane 101 expands in water. During the flattening process, the thin metal film 103 covering the microtextured surface 107 relieves the expansion-induced stress by rotating towards a center plane 121 of the polymer electrolyte membrane 101, while maintaining the continuity of the metal film 103.

FIG. 2 depicts a typical surface microstructure 200, which comprises a plurality of pyramidal protrusions 201. The protrusions 201 can also be in other shapes, so long as most of the surfaces on the protrusions 201 form an angle with the central plane 121 of the polymer electrolyte membranes 101 and there is minimal flat surfaces between the protrusions 201. The fabrication of surface microstructure 200, however, requires a special mold that is produced by a complicated etching process. Therefore, there remains a need for fuel-impermeable electrolyte membranes that are easily manufactuable.

SUMMARY

A metal-coated polymer electrolyte membrane that is permeable to proton/hydrogen atoms is disclosed. The metal-coated polymer electrolyte membrane has a wave-like surface microstructure having a plurality of parallel crests and troughs. The polymer electrolyte membrane is reinforced with a plurality of embedded wires having a Young's modulus that is greater than a Young's modulus of the polymer electrolyte membrane. The reinforcement wires are positioned in parallel to the troughs of the surface microstructure. The polymer electrolyte membrane is coated with a metal film that is permeable only to protons and hydrogen. The wave-like surface microstructure and the reinforcement wires serve to protect the metal film on the polymer electrolyte membrane from expansion-induced cracking and, therefore, maintain the proton/hydrogen-only permeability of the metal-coated polymer electrolyte membrane. The proton-permeable-only, metal-coated polymer electrolyte membranes can be used to prevent crossover of fuel, gas and impurities in fuel cell applications.

BRIEF DESCRIPTION OF THE DRAWINGS

The detailed description will refer to the following drawings, in which like numerals refer to like elements, and in which.

DETAILED DESCRIPTION

A metal-coated polymer electrolyte membrane having a reinforcement structure to control membrane expansion and prevent cracking in the metal coating is disclosed. The reinforced polymer electrolyte membrane has a simplified surface microsturcture that requires no special molding and can be easily manufactured at low cost.

Figure 1A:
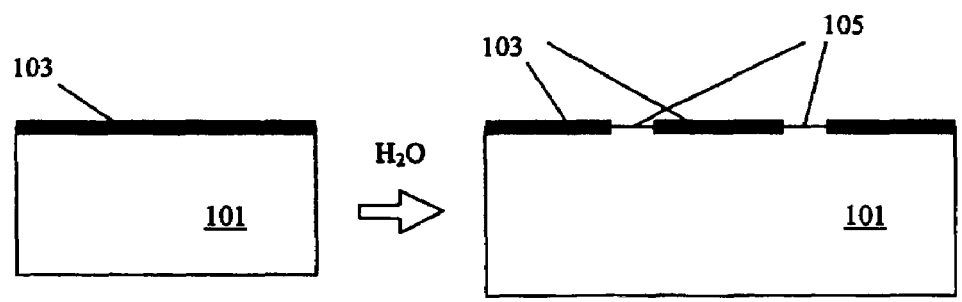
FIGS. 1A and 1B depict changes of continuity of a thin metal film under polymer electrolyte membrane expansion.
Figure 1B:
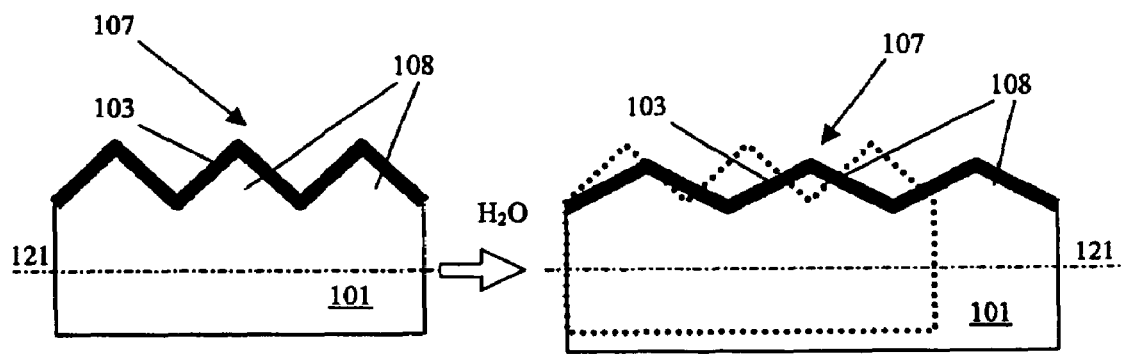
Figure 2:
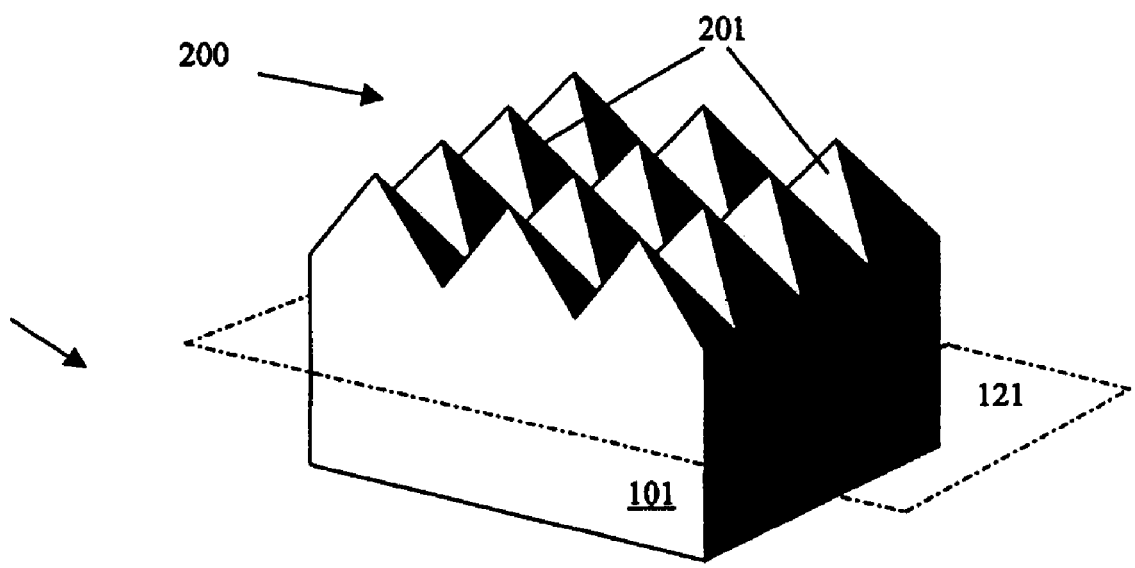
FIG. 2 depicts an embodiment of a microtextured surface.
Figure 3A:
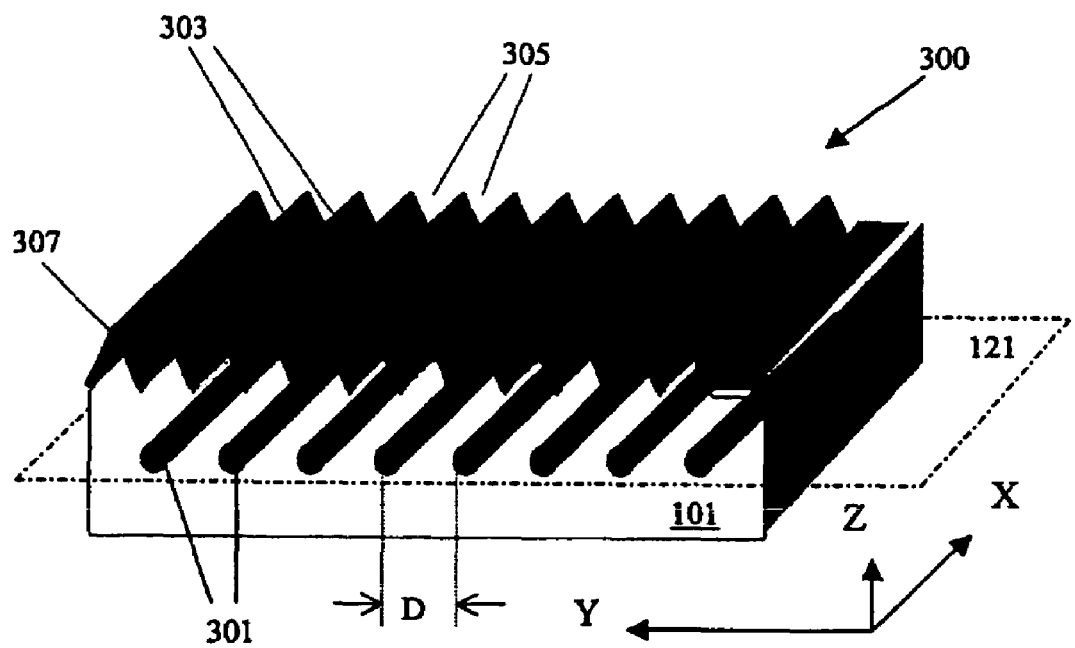
FIGS. 3A and 3B depict an embodiment of a reinforced membrane with a microtextured surface and the effect of membrane expansion on the microtextured surface

FIG. 3A depicts an embodiment of a polymer electrolyte membrane 101 reinforced with a plurality of wires 301. The wires 301 are horizontally embedded in the center of the polymer electrolyte membrane 101. The wires 301 run the entire length of the polymer electrolyte membrane 101 in the X-direction and are spaced in the Y-direction with a distance (D) between the neighboring wires. The polymer electrolyte membrane 101 also has a wave-like surface microstructure 300 with a plurality of crests 303 and troughs 305 that run in parallel to the wires 301 (i.e., in the X-direction). The wave-like surface microstructure 300 is covered with a thin metal film 307 to prevent fuel, gas and impurity crossover.

Figure 3B:
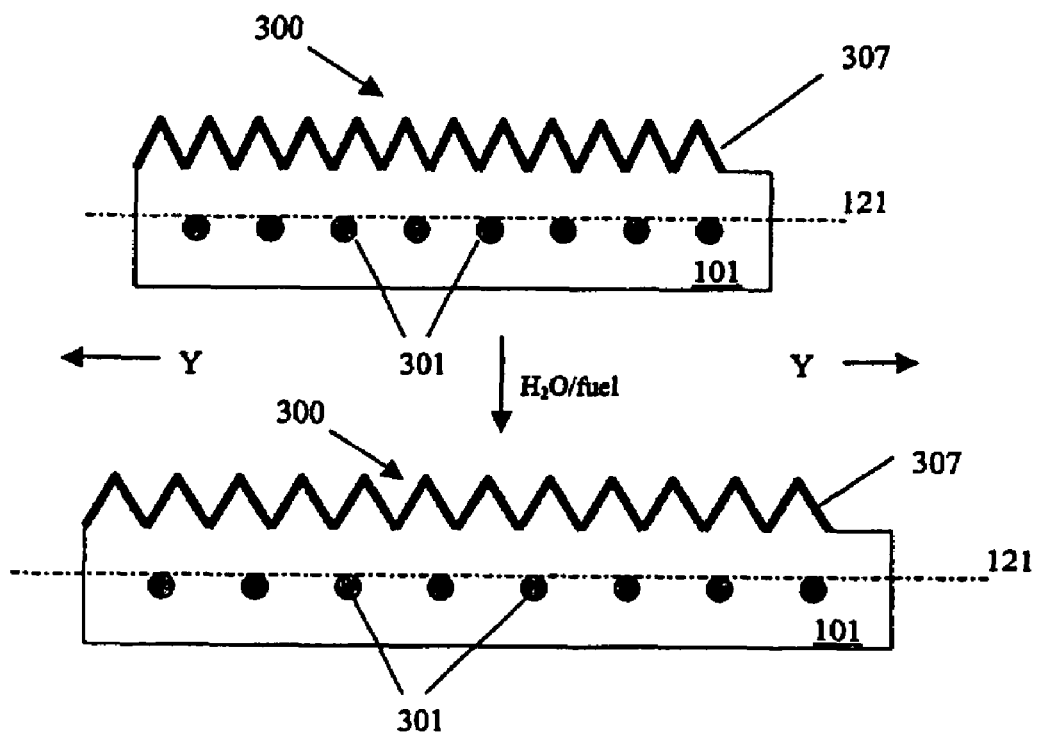

As shown in FIG. 3B, when the polymer electrolyte membrane 101 expands in a fuel composition, the adhesion between the polymer electrolyte membrane 101 and the embedded wires 301 keeps the polymer electrolyte membrane 101 from expanding in the X-direction, yet allows the polymer electrolyte membrane 101 to expand in Y-direction. In another words, the reinforcement of the polymer electrolyte membrane 101 with parallel wires 301 forces an otherwise isotropic expansion (in X- and Y-directions) of the polymer electrolyte membrane 101 into an anisotropic expansion mainly in the Y-direction. The X-direction expansion, if any, is significantly reduced. Membrane expansion in the Z-direction (FIG. 3A) is not affected by the wires 301. However, because the polymer electrolyte membrane 101 is very thin (0.1-0.01 inch), the expansion in Z-direction is negligible.

As shown in FIG. 3B, the Y-direction surface tension in the metal film 307 is released by the wave-like surface microstructure 300. Specifically, the metal film 307 on the surface of the microstructure 300 would rotate toward the center plane 121 of the polymer electrolyte membrane 101 to compensate to the increased membrane volume. Since the total surface area of the microstructure 300 remains unchanged after the expansion, the continuity of the metal film 307 is maintained.

The polymer electrolyte membrane 101 is a sulfonated derivative of a polymer that includes a lyotropic liquid crystalline polymer, such as a polybenzazole (PBZ) or polyaramid (PAR or Kevlar™) polymer. Examples of polybenzazole polymers include polybenzoxazole (PBO), polybenzothiazole (PBT) and polybenzimidazole (PBI) polymers. Examples of polyaramid polymers include polypara-phenylene terephthalimide (PPTA) polymers.

The polymer electrolyte membrane 101 also includes a sulfonated derivative of a thermoplastic or thermoset aromatic polymer. Examples of the aromatic polymers include polysulfone (PSU), polyimide (PI), polyphenylene oxide (PPO), polyphenylene sulfoxide (PPSO), polyphenylene sulfide (PPS), polyphenylene sulfide sulfone (PPS/SO$_2$), poly-paraphenylene (PPP), polyphenylquinoxaline (PPQ), polyarylketone (PK) and polyetherketone (PEK) polymers.

Examples of polysulfone polymers include polyethersulfone (PES), polyetherethersulfone (PEES), polyarylsulfone, polyarylethersulfone (PAS), polyphenylsulfone (PPSU) and polyphenylenesulfone (PPSO$_2$) polymers.

Examples of polyimide polymers include the polyetherimide polymers as well as fluorinated polyimides.

Examples of polyetherketone polymers include polyetherketone (PEK), polyetheretherketone (PEEK), polyetherketone-ketone (PEKK), polyetheretherketone-ketone (PEEKK) and polyetherketoneetherketone-ketone (PEKEKK) polymers.

The polymer electrolyte membrane 101 may include a sulfonated derivative of a non-aromatic polymer, such as a perfluorinated ionomer. Examples of ionomers include carboxylic, phosphonic or sulfonic acid substituted perfluorinated vinyl ethers.

The polymer electrolyte membrane 101 may also include a sulfonated derivative of blended polymers, such as a blended polymer of PEK and PEEK.

The polymer electrolyte membrane 101 may have a composite layer structure having two or more polymer layers. Examples of composite layer structures are Nafion™ or PBI membranes coated with sulfonated polyetheretherketone (sPEEK) or sulphonated polyetheretherketone-ketone (sPEEKK). The polymer layers in a composite layer structure can be either blended polymer layers or unblended polymer layers or a combination of both.

The polymer electrolyte membrane 101 is chemically stable to acids and free radicals, and thermally/hydrolytically stable to temperatures of at least about 100° C. Preferred polymer electrolyte membranes 101 have an ion-exchange capacity (IEC) of >1.0 meq/g dry membrane (preferably, 1.5 to 2.0 meq/g) and are highly ion-conducting (preferably from about 0.01 to about 0.5 S/cm).

Preferred polymer electrolyte membranes 101 are fluorocarbon-type ion-exchange resins having sulfonic acid group functionality and equivalent weights of 800-1100, including Nafion™ membranes.

The wires 301 can be made of any material that has a Young's modulus that is greater than a Young's modulus of the polymer electrolyte membrane 101. Young's modulus is a commonly used measurement for a material's stiffness. Young's modulus is defined as the stress of a material divided by the material's strain. Generally speaking, Young's modulus is how much a material yields for each pound of load put on the material. A material with a higher Young's modulus tends to yield less than a material with a lower Young's modulus under the same tensile force. In order to effectively limit or eliminate the X-direction expansion of the wire-reinforced polymer electrolyte membranes 101, the wires 301 should have a Young's modulus that is at least 5-times greater, and preferably at least 100-times greater than the Young's modulus of the polymer electrolyte membrane 101.

Figure 4A:
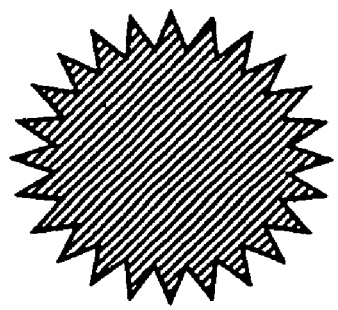
FIGS. 4A, 4B and 4C depict the cross-section view of various reinforcement wires.
Figure 4B:
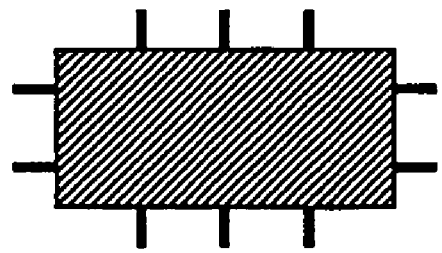
Figure 4C:
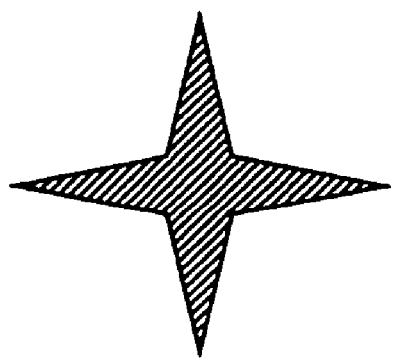

As shown in FIGS. 4A-4C, the wire 301 can have a cross-section area of any shape. In one embodiment, the wire 301 has a wrinkled surface (FIG. 4A). In another embodiment, the wire 301 has needle-like protrusions along its stem (FIG. 4B) In yet another embodiment, the wire 301 has a star-shaped cross-section area (FIG. 4C). All these variations serve to increase the adhesion between the wires 301 and the polymer electrolyte membranes 101.

Figure 5:
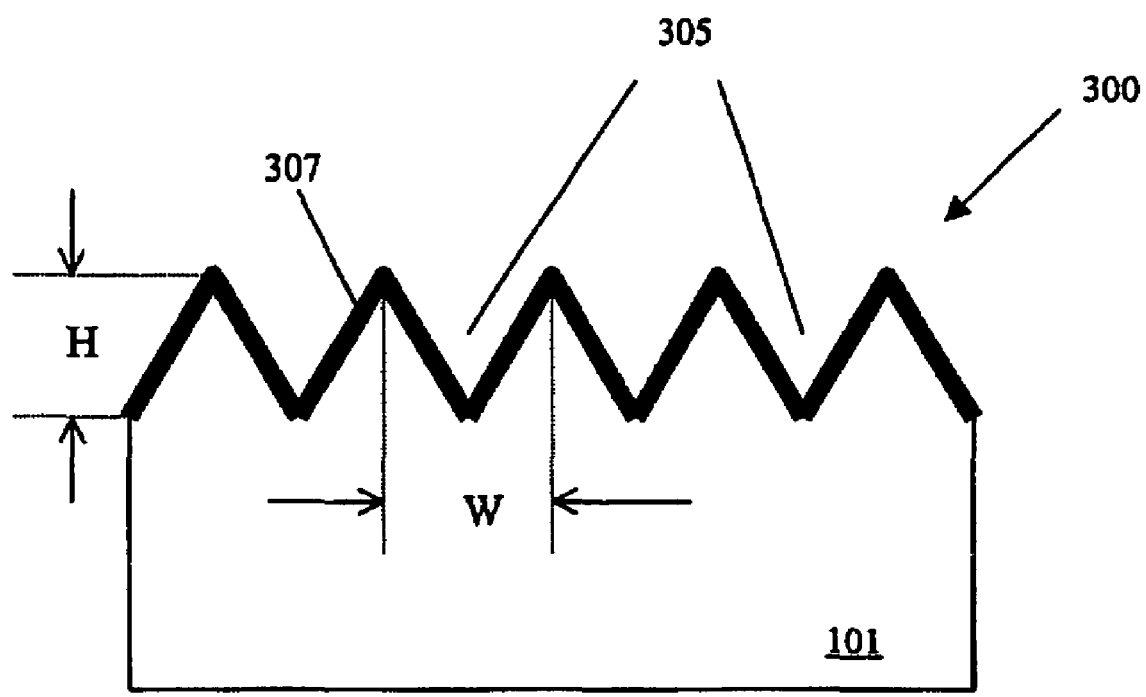
FIG. 5 defines the dimensions of a surface microstructure.

The dimensions of the surface microstructure 300 are generally defined by the average height (H) and average width (W) of the troughs 305 (FIG. 5). The optimal H and W values of a particular surface microstructure 300 depend on the thickness of the metal film 307. Typically, the height (H) of the troughs 305 is at least three-times greater than the thickness of the metal film 307 so that the contour of the surface microstructure 300 is maintained after coating with the metal film 307.

The metal film 307 can be deposited onto the surface microstructure 300 of the polymer electrolyte membrane 101 by electroless plating, sputtering, atomic layer deposition, chemical vapor deposition, or any other process that is capable of coating the surface of a non-conductive material. The metal film 307 comprises a metal or an alloy that is permeable to protons/hydrogen but is not permeable to hydrocarbon fuel molecules, gases such as carbon monoxide (CO), or impurities in the fuel such as sulfur. Examples of such metals or alloys include palladium (Pd), platinum (Pt), neodymium (Nd), vanadium (V), iron (Fe), tantalum (Ta), and alloys thereof.

The metal film 307 can be a discontinuous layer of metal particles, so long as the distances between the metal particles are small enough to prevent fuel, gas and impurity crossover in a particular application. The thin metal film 307 can also be a composite film comprising multiple layers. For example, Pd and Pt are more corrosion-resistant than Nb, V, Fe and Ta. Therefore, a composite thin metal film 307 may comprise a first layer of Nb, V, Fe, Ta or a alloy thereof, which is covered by a second layer of Pt, Pd or an alloy thereof.

Both sides of the polymer electrolyte membrane 101 can be coated, so that the polymer electrolyte membrane 101 is sandwiched between two layers of metal film 307.

The metal-coated polymer electrolyte membranes may be used as PEMs in low temperature fuel cells, and preferably in PEM based direct methanol fuel cells. In an embodiment, one side of the PEM is microtextured and covered by the thin metal film 307 to prevent fuel crossover. In another embodiment, both sides of the PEM are microtextured and covered by the thin metal film 307. In yet another embodiment, the metal-coated polymer electrolyte membrane is subjected to an electroless plating process after hydration to cure any minor cracks in the metal film. The electroless plating process can be performed in the fuel cell where the metal-coated polymer electrolyte membrane serves as a PEM.

The metal-coated polymer electrolyte membrane may be further coated with a layer of catalyst to form a catalytic, fuel-impermeable polymer electrolyte membrane. Examples of the catalyst include, but are not limited to, any noble metal catalyst system. Such catalyst systems comprise one or more noble metals, which may also be used in combination with non-noble metals. One preferred noble metal material comprises an alloy of platinum (Pt) and ruthenium (Ru). Other preferred catalyst systems comprise alloys of platinum and molybdenum (Mo); platinum and tin (Sn); and platinum, ruthenium and osmium (Os). Other noble metal catalytic systems may be similarly employed. The catalyst can be deposited onto the metal film 307 by electroplating, sputtering, atomic layer deposition, chemical vapor deposition, or any other process that is capable of coating the surface of a conductive material.

The metal film 307 itself may also serve as a catalyst, such as in the case of Pd or Pd alloy. The reactivity of the catalyst can be enhanced by a plasma oxidization process or by using a porous deposit of fine catalyst powders such as Pt black and Pd black, Both Pt black and Pd black have been used as surface modification of electrodes to improve the hydrogenation rate. For example, see Inoue H. et al. "Effect of Pd black deposits on successive hydrogenation of 4-methylstyrene with active hydrogen passing through a Pd sheet electrode" Journal of The Electrochemical Society, 145: 138-141, 1998; Tu et al. "Study of the powder/membrane interface by using the powder microelectrode technique I. The Pt-black/Nafion® interfaces" Electrochemica Acta 43:3731-3739, 1998; and Cabot et al. "Fuel cells based on the use of Pd foils" Journal of New Materials for Electrochemical Systems 2:253-260, 1999.

In an embodiment, a PEM-electrode structure is manufactured utilizing a polymer electrolyte membrane that is microtextured and coated on both sides with the thin metal film 307 and a catalyst. Porous electrodes that allow fuel delivery and oxygen exchange are then pressed against the catalyst layers of the PEM to form the PEM-electrode structure, which can be used in fuel cell applications.

Although preferred embodiments and their advantages have been described in detail, various changes, substitutions and alterations can be made herein without departing from the spirit and scope of the metal-coated wire-reinforced polymer electrolyte membrane as defined by the appended claims and their equivalents.

What is claimed is:

1. A fuel cell assembly, comprising:
an anode;
a cathode;
an electrolyte connecting the anode and the cathode; and
a fuel,
wherein said electrolyte is a metal-coated polymer electrolyte membrane comprising a wave-like surface microstructure having crests and troughs, a plurality of reinforcement wires embedded in said membrane, and a metal film deposited on top of said surface microstructure, wherein said reinforcement wires have a Young's modulus that is greater than a Young's modulus of said membrane, and are positioned in parallel to the troughs of the wave-like surface structure, and wherein said metal film is permeable to proton and impermeable to the fuel.

2. The fuel cell assembly of claim 1, wherein said metal-coated polymer electrolyte membrane has the wave-like surface microstructure on both sides, and wherein the wave-like surface microstructure on both sides is covered by the metal film.

3. A fuel cell assembly, comprising:
a fuel; and
a PEM-electrode structure comprising a polymer electrolyte membrane having a wave-like surface microstructure on both sides and porous electrodes that allow fuel delivery and oxygen exchange,
wherein said polymer electrolyte membrane is reinforced with wires, said reinforcement wires have a Young's modulus that is greater than a Young's modulus of said membrane, and are positioned in parallel to troughs of the wave-like surface microstructure.

4. The fuel cell assembly of claim 3, further comprising a metal film deposited on top of the wave-like surface microstructure, wherein the metal film is Pd or a Pd alloy.

5. The fuel cell assembly of claim 3, further comprising a metal film deposited on top of the wave-like surface microstructure, wherein the metal film is further covered with a catalyst.

6. The fuel cell assembly of claim 5, wherein the catalyst is one of Pt, Pt alloy, Pt black and Pd black.

* * * * *

UNITED STATES PATENT AND TRADEMARK OFFICE
CERTIFICATE OF CORRECTION

PATENT NO. : 7,435,497 B2
APPLICATION NO. : 11/250051
DATED : October 14, 2008
INVENTOR(S) : Alfred I-Tsung Pan et al.

It is certified that error appears in the above-identified patent and that said Letters Patent is hereby corrected as shown below:

In column 1, line 31, delete "$CO_{2+6}e^-$" and insert -- $CO_2 + 6e^-$ --, therefor.

Signed and Sealed this

Twenty-fourth Day of February, 2009

JOHN DOLL
*Acting Director of the United States Patent and Trademark Office*